United States Patent Office.

NICHOLAS CHARLES SZERELMEY, OF BELGRAVE ROAD, PIMLICO, ASSIGNOR TO WILLIAM HENRY VALPY, OF NO. 8 CRAIG'S COURT, CHARING CROSS, ENGLAND.

Letters Patent No. 92,225, dated July 6, 1869; patented in England, January 29, 1869.

IMPROVEMENT IN THE MANUFACTURE OF TARPAULINS.

The Schedule referred to in these Letters Patent and making part of the same.

*To all to whom it may concern:*

Be it known that I, NICHOLAS CHARLES SZERELMEY, of Belgrave Road, Pimlico, in the county of Middlesex, England, gentleman, a subject of the Queen of Great Britain, have invented or discovered new and useful "Improvements in Making Tarpaulin in different colors, and in treating sail-cloth and other fabrics, to preserve them from rapid destruction by the sea-air and other corroding influences;" and I, the said NICHOLAS CHARLES SZERELMEY, do hereby declare the nature of the said invention, and in what manner the same is to be performed, to be particularly described and ascertained in and by the following statement thereof; that is to say—

This invention has for its object improvements in making tarpaulin in different colors, and in treating sail-cloth and other fabrics, to preserve them from rapid destruction by the sea-air and other corroding influences.

I boil, in an iron pot, one hundred weight of gas-tar, until the same becomes hard, and, at the same time, I boil, in another iron pot, which is heated by steam admitted between the pot and a jacket or casing which surrounds it, fourteen gallons of Stockholm tar-spirit, ten pounds of American rosin, and one gallon of rosin-oil.

When these ingredients are completely dissolved and mixed, they are drawn, together with the boiled tar, which should be at about the same temperature, into a mixing-vat or vessel, and the whole is thoroughly stirred together.

When the mixing has been continued for about ten minutes, two ounces of commercial sulphuric acid are added, and the mixing is continued.

This is compound No. 1, and it is suitable for the preparation of dark-colored tarpaulins, and for preserving sail-cloth and other fabrics.

The cloth to be prepared is spread on the ground, and composition, which is heated sufficiently to render it perfectly fluid, is brushed into it with a hard brush, and so the fabric is thoroughly saturated with the composition. When one side of the fabric has been covered, it is turned over, and the other side is similarly treated.

For tarpaulins, I frequently apply more than one coating on each side.

To make a composition suitable for preparing red tarpaulins, I take twenty-eight pounds of red oxide of iron, and grind it, in a color-mill, with six gallons of Stockholm tar-spirit, and one gallon of rosin-oil, in which two pounds of rosin-powder are dissolved.

After the whole is ground, I mix in it six pints of No. 1 compound.

This is compound No. 2. I use it in the same manner as the composition No. 1, for tarpaulins, sail-cloth, and other fabrics.

Other colors may be prepared in a similar manner, by substituting other pigments for the oxide of iron.

What I claim, is—

The improvements in making tarpaulins, and in treating sail-cloth and other fabrics, substantially as above described.

N. C. SZERELMEY.

Witnesses:
G. F. WARREN,
THOS. BROWN,
} Both of No. 17 Gracechurch Street, London, E. C.